Figure 1:
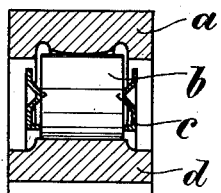

J. H. K. KIRNER.
ROLLER BEARING.
APPLICATION FILED JUNE 25, 1909.

967,934.

Patented Aug. 23, 1910.

WITNESSES
W. P. Burke
A. F. Heuman

INVENTOR
Josef Hermann Karl Kirner
BY
ATTY.

UNITED STATES PATENT OFFICE.

JOSEF HERMANN KARL KIRNER, OF STUTTGART, GERMANY, ASSIGNOR TO NORMA COMPAGNIE, G. M. B. H., OF CANNSTATT, WÜRTEMBERG, GERMANY.

ROLLER-BEARING.

967,934.

Specification of Letters Patent. Patented Aug. 23, 1910.

Application filed June 25, 1909. Serial No. 504,292.

*To all whom it may concern:*

Be it known that I, JOSEF HERMANN KARL KIRNER, a subject of the Emperor of Germany, residing at Stuttgart, Germany, have invented new and useful Improvements in or Relating to Roller-Bearings, of which the following is a specification.

This invention relates to roller bearings such as may be employed for general purposes.

In comparison with ball bearings, roller bearings have the advantage that they do not allow the shaft carried therein so much elastic play in a radial direction, and that the pressure on the contact surfaces is smaller owing to there being a larger bearing surface to support the weight. In roller bearings of known type provided with cylindrical i. e. parallel rollers, and cylindrical flat races or roller grooves, however, these advantages are retained only so long as the condition of accurate contact along generating lines is fulfilled. Should the rollers or the shaft supported thereby, get slightly out of alinement, then the surfaces in contact become very small, and, since the rollers are distorted or disarranged at the same time, the bearing suffers damage. In order to obviate this defect, attempts have been made to reduce the load to comparatively small dimensions by employing longer rollers, or to make the rollers yield by subdividing them, or manufacturing them from a spirally coiled strip, or again, short, barrel-shaped rollers have been used.

In the roller bearing constructed in accordance with this invention, the defects attending the forms hitherto known are removed by retaining the cylindrical parallel shape of the rollers and arching one or both of the races in which the rollers are mounted. As a result of this arrangement the cylindrical rollers make contact with the arched race at one point only and the skewing of the shaft is no longer able to exert a one-sided pressure on the rollers, there being no change in the dimensions of the contact surfaces, and consequently a very high load can be carried.

Concerning the skewing of the shaft, it is immaterial whether the inner or outer race or roller groove is arched, the arching of the outer race being accompanied by the further advantage that no inconvenience results if the rollers also get aslant. Hence, in this case there is no need to adjust the guiding of the rollers so carefully as when the inner race alone is arched. Owing to the use of cylindrical rollers, the axial displacement between the two race rings is mutual. The lateral guidance of the rollers is secured by providing annular lugs on either the outer or inner ring.

The invention will be further described with reference to the accompanying drawing.

Figure 2:
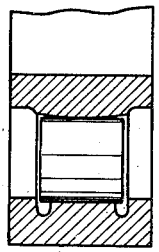
Figure 3:
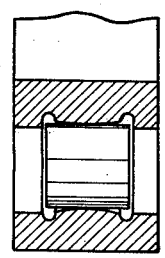

Figure 1 represents a sectional view of a roller bearing having a cylindrical inner race and an arched outer race. In this form of construction the bearing is well adapted for practical manufacture. Fig. 2 is a sectional view of a modified form in which the inner race ring is arched and the outer race is cylindrical. Fig. 3 is a sectional view of another modification in which both races are arched.

The roller bearing shown in section in Fig. 1 is composed of the outer race ring $a$, the rollers $b$, the cage $c$ and the inner race ring $d$. The cage consists of a sheet metal ring of U-section, which engages the rollers, near their axes of rotation, after the manner of the American Patent 796648 of 8th August 1905. In Fig. 1 this is effected by the provision of conical or rounded projections of the cage inserted in corresponding depressions in the rollers. This cage may be replaced by any other cage.

What I claim then is:—

1. In a roller bearing, in combination, a plurality of cylindrical rollers, each roller being of uniform cross section in the direction of its length, and two raceway rings having roller races for engaging said rollers, the roller engaging surface of one of said races being shaped to permit rocking movement of the roller with respect thereto.

2. In a roller bearing, in combination, a plurality of cylindrical rollers, each roller being of uniform cross section in the direction of its length and two raceway rings having roller races for engaging said rollers, one of said races having a portion of its surface engaging each of the rollers at a single point intermediate its end portions, said surface being normally free from engagement with said rollers at points other than said intermediate point, whereby the rollers may rock with respect to said surface.

3. In a roller bearing, in combination, a plurality of cylindrical rollers, each roller being of uniform cross section in the direction of its length, and two raceway rings having roller races for engaging said rollers, one of said roller races being arched, the surface of said last mentioned race being free from portions normally engaging the cylindrical surface of the roller adjacent the ends thereof.

4. In a roller bearing, in combination, a plurality of cylindrical rollers, each roller being of uniform cross section in the direction of its length, and two raceway rings having arched roller races for engaging said rollers, the surfaces of said races being free from portions normally engaging the ends of said rollers.

5. In a roller bearing, in combination, a plurality of cylindrical rollers, each roller being of uniform cross section in the direction of its length, and two raceway rings having roller races for engaging said rollers, the surface of one of said races being arched throughout its entire width, whereby the rollers may rock with respect thereto.

6. In a roller bearing, in combination, a plurality of cylindrical rollers, each roller being of uniform cross section in the direction of its length, two raceway rings having roller races for engaging said rollers, one of said races being arched, the surface of said last mentioned race being free from portions normally engaging the cylindrical surface of the roller adjacent the ends thereof, and guiding means for said rollers.

In testimony whereof I have signed my name to this specification in the presence of two subscribing witnesses.

JOSEF HERMANN KARL KIRNER.

Witnesses:
KARL ERHARD JUNGHAUS,
EMIL LININFEIN.